July 30, 1968 P. L. SPEICHER 3,394,892
MATERIAL SPREADER
Filed Oct. 23, 1965 2 Sheets-Sheet 1

INVENTOR.
PAUL L. SPEICHER

BY Kimmel, Crowell & Weaver
ATTORNEYS.

July 30, 1968  P. L. SPEICHER  3,394,892
MATERIAL SPREADER
Filed Oct. 23, 1965  2 Sheets-Sheet 2
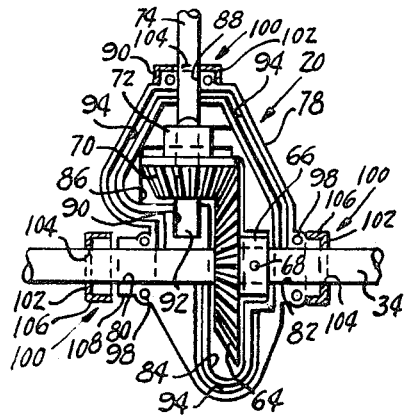
FIG. 4
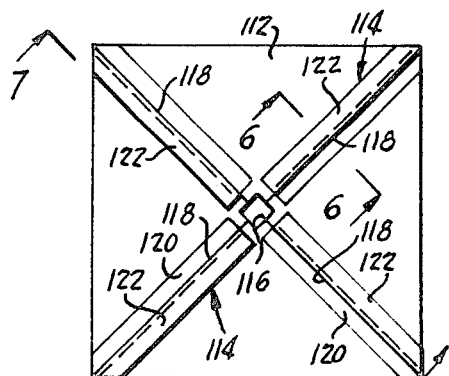
FIG. 5
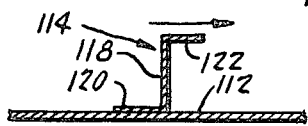
FIG. 6
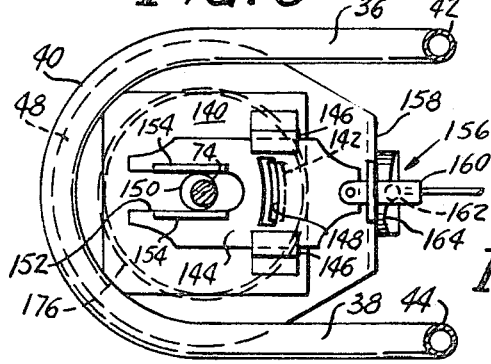
FIG. 10
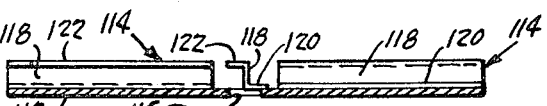
FIG. 3
FIG. 7
FIG. 8
FIG. 9
INVENTOR.
PAUL L. SPEICHER
BY Kimmel, Crowell & Weaver
ATTORNEYS.

United States Patent Office 3,394,892
Patented July 30, 1968

3,394,892
MATERIAL SPREADER
Paul L. Speicher, Urbana, Ind., assignor to The Cyclone Seeder Co., Inc., Urbana, Ind., a corporation of Indiana
Filed Oct. 23, 1965, Ser. No. 503,052
5 Claims. (Cl. 239—683)

ABSTRACT OF THE DISCLOSURE

Broadcasting apparatus for pulverant or granular material including a wheel mounted frame, an axle extending between a pair of opposed wheels and connected in driving relationship with respect to at least one of said wheels, a material hopper mounted on said frame and having a downwardly facing opening formed therein in confronting relationship relative to the axle, valve means extending across the open end of the hopper for controlling the flow of material therefrom, a broadcasting plate supported for rotation below the valve means, means for effecting rotation of the valve plate including a shaft connected with the broadcasting plate, gear means connecting the shaft in driving relationship with the axle, and housing means for the gear means and providing bearing surfaces for the axle and the shaft.

---

This invention relates to a material spreader of the type which may be used to spread pulverant or granular material such as fertilizer, weed control material, seeds and the like, and more particularly to a device having a hopper for receiving a charge of material, a spreader means for throwing such material into a predetermined area, the frame mounting the hopper and spreader means on at least one wheel for providing mobility.

It is an object of the instant invention to provide a material spreader supported from wheel means by a tubular frame resulting in strong construction and inexpensive manufacture and assembly Another object of the instant invention is to provide a material spreader having a plurality of interchangeable ejecting means mounted in material receiving relation with a hopper to vary the area and configuration of the resulting material deposition.

Still another object of the instant invention is to provide an ejecting or spreading means in material receiving relation to a material carrying hopper having means thereon for directing the throw of material onto an underlying surface.

A more specific object of the instant invention is to provide an ejecting or spreading means including a disc having its center raised above the periphery thereof.

A still further object of the instant invention is to provide a gate or door means positioned in the pathway communicating a hopper and an ejecting means for controlling and facilitating the flow of pulverant material from the hopper to the ejecting means.

Another object of the instant invention is to provide a housing encompassing a plurality of power transmitting means and providing bearing means for shafts connected to the power transmitting means.

A more specific object of the instant invention is to provide an oscillatable door mounted in the pathway connecting a hopper and an ejecting means, the door being oscillated in direct proportion to the speed of the vehicle across an underlying surface.

A further object of the invention is to provide a specific type impeller blade having an offset plate or flange at its top which will, by virtue of its construction, provide an extremely uniform pattern of spread or distribution regardless of the weight or density of the material dispersed.

Another more specific object of the instant invention is to provide a suitable means for adjusting the position of an oscillatable door for selectively varying the quantity of material flowing from a pulverant material containing hopper.

Other objects and advantages of the instant invention reside in the combinations of elements, arrangements of parts, and features of construction and operation, all as will be more fully pointed out hereinafter and disclosed in the accompanying drawings wherein there are shown preferred embodiments of this inventive concept.

In the drawings:

FIGURE 3 is a rear elevational view of the material spreader of FIGURES 1 and 2, the handle being broken away for clarity of illustration;

FIGURE 4 is an enlarged view of the power connections between a pair of ground engaging wheels and a power take-off for operating an ejecting means and an oscillatable door;

FIGURE 5 is a top plan view of the ejecting means of the instant invention;

FIGURE 6 is cross-sectional view of the ejecting means of FIGURE 5 taken along line 6—6 thereof and viewing in the direction of the arrows;

FIGURE 7 is another cross-sectional view of the ejecting means of FIGURE 5 taken along lines 7—7 thereof and viewing in the direction of the arrows;

FIGURE 8 is a cross-sectional view of a modified form of ejecting means in which the center is depressed below the plane of the periphery;

FIGURE 9 is a cross-sectional view of still another embodiment of the ejecting means of the instant invention showing the center thereof positioned above the plane of the periphery; and FIGURE 10 is a view of the underside of the pulverant material hopper of the instant invention as may generally be seen from line 10—10 in FIGURE 1.

Figure 2:
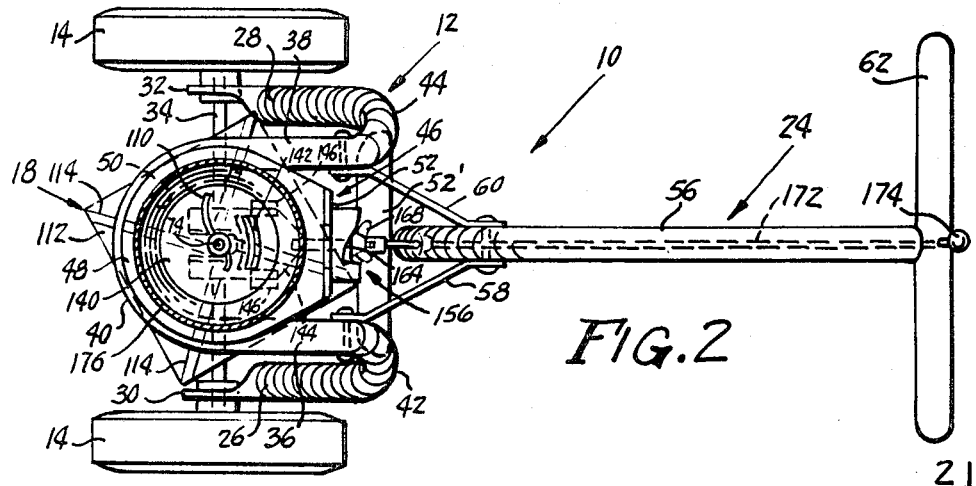
FIGURE 2 is a cross-sectional view of the device of FIGURE 1 taken along line 2—2 thereof and viewing in the direction of the arrows.

Referring now to the drawings in detail, wherein like reference characters designate like elements throughout the several views thereof, there is indicated generally at 10 a material spreader comprising a tubular frame shown generally at 12 mounting a pair of ground engaging wheels 14, a hopper 16 positioned on frame 12, an ejecting means designated generally at 18 rotatably driven by a power take-off shown generally at 20, a door or gate means designated generally at 22 positioned in the bottom of hopper 16 for controlling the flow of pulverant material to ejecting means 18 and a handle shown generally at 24.

Frame 12 includes a pair of straight tubular sections 26, 28 journaled by a pair of bearings 30, 32 on an axle 34 connecting wheels 14. In the hand powered material spreader illustrated, axle 34 is fixedly connected to one of wheels 14 to provide motive power for ejecting means 18 as more fully explained hereinafter. In the event that material spreader 10 is power driven, each of wheels 14 may be fixedly connected to axle 34 for transmitting power.

Frame 12 also includes a pair of straight substantially parallel horizontal tubular sections 36, 38 connected together by a horizontal semicircular tubular section 40 with straight sections 26, 28 being connected to horizontal straight sections 36, 38 by a pair of arcuate tubular sections 42, 44. Hopper 16 is mounted in the opening formed by tubular sections 36, 38, 40 by a hopper mounting bracket shown generally at 46 comprising a sheet of material 48 secured, as by welding or the like, to tubular sections 36, 38, 40, and forming an aperture 50 for receiving the lower end of hopper 16. Hopper mounting bracket 46 also includes an upstanding arm 52 rearwardly of aperture 50 against which the side of hopper 16 may rest.

Arcuate sections 42, 44 of frame 12 are secured together by a transverse tubular brace 52' which provides one point of securement, as by a conventional nut and bolt 54, to the lower end of a central portion 56 of handle 24. Central portion 56 is secured to frame 12 by a pair of braces 58, 60 which connect central portion 56 of handle 24 to each of straight sections 36, 38 of frame 12.

Handle 24 is equipped with a transverse bar 62 providing a grasping means for an operator. It should be understood that in the hand powered device illustrated the operator will exert a force upon transverse bar 62 which will propel material spreader 10 from right to left as may be seen in FIGURES 1 and 2. In the alternative, material spreader 10 may be powered by an engine, such as an internal combustion, diesel or electric motor, in which case bar 62 will be utilized to steer material spreader 10.

Referring now to FIGURES 3 and 4, a bevel gear 64 is fixedly mounted on axle 34 by a collar 66 and pin 68. In meshing relation with gear 64 is a second smaller bevel gear 70 fixedly mounted as by a collar 72 onto a shaft 74 extending at right angles with respect to axle 34. It will be seen that the rotation of axle 34 will result in the rotation of shaft 74. As previously mentioned, axle 34 is fixedly connected to one of wheels 14 such that the propulsion of material spreader 10 along a designated path will result in the rotation of shaft 74 in proportion to the speed of spreader 10. As will be more fully explained hereinafter, shaft 74 is in driving relation with respect to ejecting means 18 for expelling pulverant material outwardly from spreader 10.

Encompassing gears 64, 70 is a housing shown generally at 76 formed of any suitable material, such as plastic, metal or fiberglass, made in two half sections, one of which is shown in FIGURE 4 at 78, it being understood that the other of housing sections 78 is a mirror image of the one shown in FIGURE 4. Housing sections 78 form aligned first and second bearing areas 80, 82 for the reception of axle 34 with an enlarged depression 84 being formed to receive large bevel gear 64.

Housing sections 78 also form a smaller depression 86 for receiving small bevel gear 70. A third bearing area 88 is formed perpendicular to bearing areas 80, 82 for receiving shaft 74 with a fourth bearing area 90 being aligned with bearing area 88 and positioned on the other side of depression 86 for receiving a stub axle 92 of shaft 74.

Housing sections 78 are secured together by a plurality of interfitting components, the first of which is a groove 94 extending substantially about the periphery of section 78 as may be seen in FIGURE 4. The other of sections 78 is formed with a tongue complementarily shaped to groove 94 for reception therein. The second interfitting connection is a plurality of circular indentations 98 positioned adjacent bearing areas 80, 82, 88 for receiving complementarily shaped pins on the other of housing sections 78.

The last of the interfitting connecting devices is shown generally at 100 and includes a circular plate 102 forming an aperture 104 received about the associated shaft and carrying an annular flange 106 mounted on a shoulder 108 of housing section 78 adjacent bearing areas 80, 82, 88. Connecting means 100 are preferably made of a resilient material, such as plastic or the like, such that annular flanges 106 may snap upon shoulders 108.

Housing sections 78 are preferably made of a hard plastic material which may be molded or pressed in a known manner to form the appropriately configured housing section. A suitable paste lubricant may be positioned within depressions 84, 86 to lubricate gears 64, 70 with tongue and groove 94 acting to inhibit the loss of lubricant.

The upper end of shaft 74 is rotatably mounted in the bottom of hopper 16 and may carry an agitator 110 for agitating the interior of hopper 16 as may be necessary when handling materials that tend to agglomerate. Since hopper 16 is positioned substantially vertically from power take-off 20, it will be seen that shaft 74 is located in a substantially vertical position.

Figure 1:
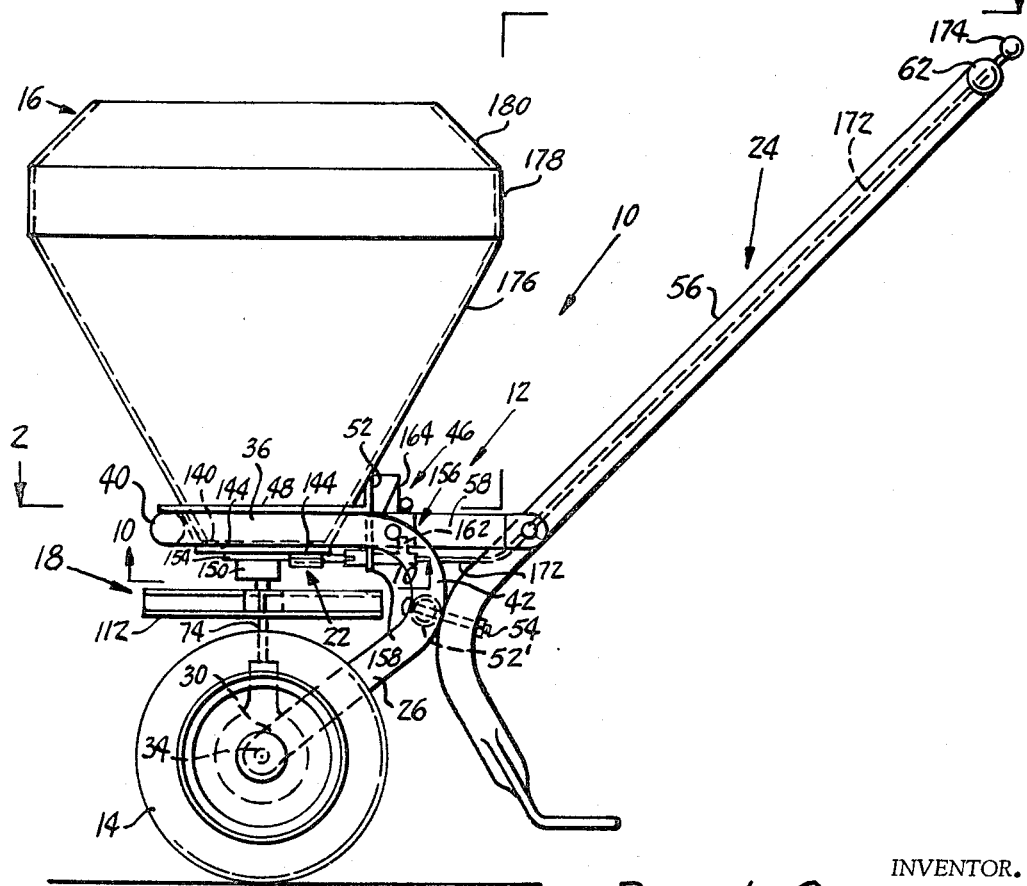
FIGURE 1 is a side elevational view of the material spreader of the instant invention.

Fixedly mounted on vertical shaft 74 below hopper 16 and above wheels 14 is ejecting means 18 as may be seen in FIGURES 1 and 3. Ejecting means 18 includes a substantially planar plate 112, which may be of any desirable configuration, but which is preferably square as shown in FIGURE 5, carrying a plurality of arms shown generally at 114 extending radially from a center 116, which is illustrated as a square opening for non-rotatably receiving shaft 74.

Arms 114 include a substantially vertical section 118 perpendicularly secured to planar plate 112 by a flat section 120 fixedly secured thereto as by rivets, welds, metal screws or any other conventional fastening means. In the alternative, perpendicular section 118 may be welded to planar plate 112. Arms 114 carry an upper section 122 extending from perpendicular section 118 in the direction of travel. Upper section 122 acts to direct the thrown material to limit its upward movement. It will be seen that pulverant material contacting planar plate 112 will come in contact with perpendicular section 118 and will be thrown therefrom with upper section 122 limiting the upward travel of a considerable portion of the thrown material.

Referring now to FIGURE 8, there is shown generally at 124 another form of ejecting means which is identical with ejecting means 18 in all respects except that, in lieu of planar plate 112, a plate 126 is provided having its center positioned below its periphery. Ejecting means 124 includes a plurality of upstanding arms 128 identical with arms 114 extending radially from a square aperture 130 in the center of plate 126. It will be apparent that ejecting means 124 will tend to throw pulverant material in a slightly upward direction thus increasing the area covered and decreasing the concentration of material added.

Referring now to FIGURE 9, there is shown generally at 132 another form of ejecting means which is identical with ejecting means 18, 124 except that, in lieu of planar plate 112 and centrally depressed plate 126, there is provided a plate 134 having a central aperture 136 positioned above the periphery of plate 134. Ejecting means 132 is equipped with a plurality of radially extending arms 138 identical with arms 114, 128. Because of the convex shape of plate 134, ejecting means 132 will tend to throw the pulverant material in a downwardly direction thus decreasing the area of coverage and increasing the concentration of pulverant material.

Ejecting means 18, 124, 132 may be releasably mounted upon shaft 74 as by upper and lower collars surrounding shaft 74, one of these collars being removable in order to replace ejecting means 18, 124, 132.

In the operation of the instant invention, a suitable pulverant material will be placed in hopper 16, such as fertilizers, seeds, herbicides, pesticides and the like, with the operator grasping transverse bar 62 of handle 24 for motivating material spreader 10 across the selected area. The rotation of wheels 14 will rotate axle 34 and consequently drive first bevel gear 64. The meshing relation between bevel gears 64, 70 will result in the rotation of shaft 74 and consequently rotate ejecting means 18.

As more fully explained hereinafter, a suitable quantity of pulverant or granular material will pass through an opening in hopper 16 onto ejecting means 18, preferably rearwardly of vertical shaft 74. The rotation of shaft 74 and ejecting means 18 will result in the throwing of a deposited pulverant material outwardly of material spreader 10 over wheels 14 as may be seen in FIGURES 1 and 3.

By replacing ejecting means 18 with either of ejecting means 124, 132, the coverage areas and concentrations deposited may be materially altered. It should be apparent, however, that the operator may vary the coverage areas and concentrations by altering the speed at which material spreader 10 moves, since the rotary speed of ejecting means 18 is directly proportional to the rotating speed of wheels 14.

As may be seen in FIGURES 2 and 10, lower wall 140 of hopper 16 is provided with a slot 142 through which pulverant material in hopper 16 may flow. An oscillatable gate 144 is mounted on the under side of wall 140 by a pair of S-shaped guides 146 and forms a slot 148 underlying slot 142 in hopper 16. An eccentric cam 150 is fixedly mounted on shaft 74 and positioned within a slot 152 in door 144. A pair of depending cam surfaces 154 are positioned on door 144 on each side of eccentric lobe 150 for engagement therewith when shaft 74 and lobe 150 are rotated.

An adjusting mechanism shown generally at 156 controls the size of the passageway formed by overlapping slots 142, 148 and includes a brace 158 mounted on frame 12 providing an aperture through which a control rod 160 extends. Control rod 160 is secured on one end to door 144 and has provided at its other end a lug 162 for engagement with a screw camming surface 164. Screw camming surface 164 is rotatably mounted about a central threaded bolt 166 and releasably secured thereon by a wing nut 168. As seen in FIGURE 3, lug 162 is positioned on camming surface 164 adjacent a substantially vertical shoulder 170 which connects the upper and lower pins of screw camming surface 164.

It will be seen that the rotation of camming surface 164 about axis 166 will position lug 162 at various distances from slot 142 in hopper 16. Accordingly, the movement of lug 162 will vary the passageway formed by the juxtaposition of slots 142, 148.

In the alternative or in addition to camming surfaces 162, 164, a conventional pull wire 172 may be threaded through central handle portion 56 and through an aperture in transverse bar 62 for controlling the passageway size as previously indicated. A knob 174 is provided exteriorly of transverse bar 62 to facilitate the inward and outward movement of wire 172 as may be performed in the conventional manner.

When it is desired to close slot 142 in the bottom of hopper 16 for any reason, it is necessary only to rotate cam 164 or pull knob 174 to close slot 142 in the bottom of hopper 16. Material spreader 10 may then be moved to any location at which time slot 142 may be opened to the desired extent.

Camming surface 164 or wire 172 may be equipped with a plurality of indicia representing the quantity of material to be passed out of hopper 16. The movement of material spreader 10 along an underlying surface will result in the rotation of shaft 74 as previously indicated consequently causing the rotation of material spreader 18, eccentric lug 150, and agitator 110 if such is used. The rotation of eccentric lug 150 results in its contacting depending camming surfaces 154 and moving oscillatable door 144 in a generally lateral direction as is allowed by the loose fit of guides 146 and the pivotal connection between door 144 and control bar 160.

The previous description has been made with reference to hopper 16 in only a general manner for it is to be understood that any suitably shaped hopper may be utilized with the material spreader of the instant invention. It has been found, however, that the illustrated hopper configuration is of particular utility and has particular advantages in obviating or inhibiting the loss of pulverant material from the hopper, especially during the hopper filling operation, as will be more fully explained hereinafter.

Hopper 16 includes a main material storage portion 176 which is frusto-conical in shape having wall 140 closing the smaller area. Material storage section 176 is preferably substantially vertical with the larger opening comprising the inlet thereto.

A cylindrical ring 178 is fixedly secured to the upper end of main storage portion 176 and carries a second frusto-conical shaped section 180 having the larger opening juxtaposed to cylindrical ring 178. As may be seen in FIGURES 1 and 3, the smaller opening of frusto-conical section 180 faces upwardly for receiving a charge of pulverant material. In the past, it has been found that the dumping of sack contents into a hopper results in the boiling of finely granulated material out of the inlet. This phenomenon is partially obviated by the overhanging frusto-conical lip 180 which tends to deflect the airborne material into the interior of hopper 16.

It is now seen that there is herein provided an improved material spreader having all of the objects of this invention and others, including many advantages of great practical utility and commercial importance.

Since many embodiments may be made of the instant inventive concept, and since many modifications may be made of the embodiments hereinbefore shown and described, it is to be understood that the foregoing is to be interpreted merely as illustrative and not in a limiting sense.

I claim:
1. A material spreader comprising
a frame,
a hopper having an openable material discharging opening mounted on the frame,
means mounted in material receiving relation to said opening for casting material received from the hopper to an area adjacent the spreader, the casting means including a plate, means for rotating the plate, the plate providing a plurality of throwers having an upstanding arm extending outwardly from adjacent the center of the plate toward the periphery thereof, an axle extending under the hopper journalled on the frame, wheel means mounted on the axle, said means for rotating said plate comprising a shaft fixedly secured to said plate, means connecting said axle to said shaft including driving means fixedly mounted on said shaft, driving means fixedly mounted on said axle, means interconnecting said axle driving means and said shaft driving means in driving relation, a housing surrounding said axle driving means, said shaft driving means and at least a portion of said axle and said shaft, said housing having first and second aligned bearing surfaces surrounding a portion of said axle, a third bearing area surrounding said shaft and a fourth bearing surface receiving the end of said shaft, said shaft driving means being positioned between said third and fourth bearing surfaces.

2. The structure of claim 1 wherein the housing is formed of two mirror image sections and means securing the sections together.

3. The structure of claim 2 wherein one of said mirror image sections has a groove adjacent to and extending substantially around the periphery thereof and the other of said mirror image sections has tongue means shaped complementary to and for reception in said groove.

4. The structure of claim 2 wherein the securing means includes apertured annular flanges slidably mounted on the axle and the shaft, the housing forming complementarily shaped ends receiving the flanges.

5. A material spreader as defined in claim 1 and a second plate secured to said upstanding arm and extending generally in the direction of the rotary movement thereof.

References Cited

UNITED STATES PATENTS

| | | | |
|---|---|---|---|
| 321,879 | 7/1885 | Amundson et al. | 239—683 |
| 417,115 | 12/1889 | Tecktonius | 239—683 |
| 2,463,855 | 3/1949 | Crawford | 239—683 X |
| 2,553,403 | 5/1951 | Cory | 239—683 X |
| 3,041,076 | 6/1962 | Van der Lely et al. | 239—685 X |
| 3,304,093 | 2/1967 | Van der Lely | 239—685 X |

M. HENSON WOOD, JR., *Primary Examiner.*

H. NATTER, *Assistant Examiner.*